United States Patent
Allard et al.

(10) Patent No.: US 9,316,435 B2
(45) Date of Patent: Apr. 19, 2016

(54) ELECTRICITY GENERATION METHOD USING AN AIR GAS SEPARATION UNIT AND A COMBUSTION UNIT

(75) Inventors: Nicolas Allard, Pantin (FR); Alain Guillard, Paris (FR)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 881 days.

(21) Appl. No.: 13/583,371

(22) PCT Filed: Mar. 11, 2011

(86) PCT No.: PCT/FR2011/050495
§ 371 (c)(1),
(2), (4) Date: Sep. 7, 2012

(87) PCT Pub. No.: WO2011/110792
PCT Pub. Date: Sep. 15, 2011

(65) Prior Publication Data
US 2012/0326453 A1 Dec. 27, 2012

(30) Foreign Application Priority Data
Mar. 11, 2010 (FR) .................................. 10 51755

(51) Int. Cl.
| H02P 9/04 | (2006.01) |
| F25J 3/04 | (2006.01) |
| F01K 13/02 | (2006.01) |
| F23J 15/00 | (2006.01) |

(Continued)

(52) U.S. Cl.
CPC ............. *F25J 3/04533* (2013.01); *F01K 13/02* (2013.01); *F23J 15/006* (2013.01); *F23L 7/007* (2013.01); *F23N 3/002* (2013.01); *F25J 3/0266* (2013.01); *F25J 3/04836* (2013.01); *F23J 2215/50* (2013.01); *F23L 2900/07006* (2013.01); *F23N 2037/26* (2013.01); *F25J 2210/70* (2013.01);

(Continued)

(58) Field of Classification Search
CPC ...... F01K 13/02; F25J 3/04533; F25J 3/0266; F25J 3/04836; F25J 2215/04; F23N 3/002; F23N 2037/26; F23J 15/006; F23J 2215/50; F23L 7/007; F23L 2900/07006; Y02E 20/328; Y02E 20/344; Y02C 10/12
USPC .......................................................... 290/40 R
See application file for complete search history.

(56) References Cited

U.S. PATENT DOCUMENTS

| 7,028,478 B2 * | 4/2006 | Prentice, III | ..................... 60/645 |
| 8,038,746 B2 * | 10/2011 | Clark | ................................. 48/61 |

(Continued)

FOREIGN PATENT DOCUMENTS

| EP | 1959193 | 8/2008 |
| WO | WO 99/40304 | 8/1999 |
| WO | WO 2010/072729 | 7/2010 |

OTHER PUBLICATIONS

PCT/FR2011/050495, International Search Report, Feb. 29, 2012.

*Primary Examiner* — Charles Kasenge
(74) *Attorney, Agent, or Firm* — Elwood L. Haynes

(57) ABSTRACT

For a plant comprising a gas/air separation unit supplying a boiler and a boiler-fed unit for compression and/or purification of CO2, the quantity of fumes sent to the compression and/or purification unit is modified according to the sale price of the electricity generated and/or the cost of venting the fumes.

14 Claims, 1 Drawing Sheet

(51) Int. Cl.
  *F23L 7/00* (2006.01)
  *F23N 3/00* (2006.01)
  *F25J 3/02* (2006.01)
(52) U.S. Cl.
  CPC ........... *F25J 2215/04* (2013.01); *F25J 2280/02* (2013.01); *Y02C 10/12* (2013.01); *Y02E 20/328* (2013.01); *Y02E 20/344* (2013.01)

(56) References Cited

U.S. PATENT DOCUMENTS

2006/0053791 A1* 3/2006 Prentice, III ............... 60/645
2007/0034704 A1   2/2007 Hu et al.
2010/0038082 A1* 2/2010 Zubrin et al. ............. 166/268

* cited by examiner

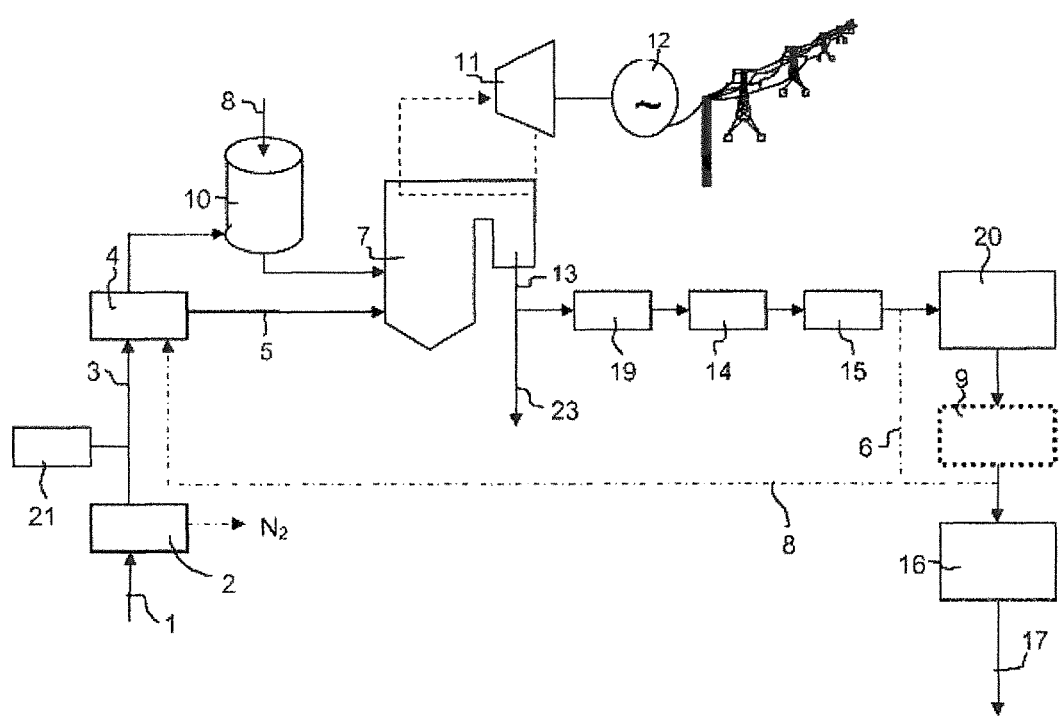

ELECTRICITY GENERATION METHOD USING AN AIR GAS SEPARATION UNIT AND A COMBUSTION UNIT

CROSS-REFERENCE TO RELATED APPLICATIONS

This application is a §371 of International PCT Application PCT/FR2011/050495 filed Mar. 11, 2011, which claims § 119(a) foreign priority to French patent application 1051755, filed Mar. 11, 2010.

Field of the Invention

The present invention relates to a method for generating electricity using an air gas separation unit, a combustion unit operating either with air, or with an oxidant that is leaner in nitrogen than the air, this oxidant originating from the air gas separation unit and producing combustion flue gases, and a unit for the compression and/or purification of the $CO_2$ originating from the combustion flue gases produced by the combustion unit.

SUMMARY OF THE INVENTION

Climate change is one of the greatest environmental challenges. The increase in the concentration of carbon dioxide in the atmosphere is very largely the cause of global warming. $CO_2$ of human origin is essentially emitted into the atmosphere by the combustion of fossil fuels in power stations.

In order to fight against $CO_2$ emissions, a technology is designed to capture the $CO_2$ that is emitted during the combustion of carbonaceous fuels in order to sequester it underground. One of the constraints that arises is the separation of the $CO_2$ in the flue gases where its fraction does not conventionally exceed 15%, which induces considerable separation energies.

One possibility consists in separating the nitrogen from the air upstream of the combustion so that all that remains at the outlet of the boiler is virtually only $CO_2$ and water, the products of the combustion. The boiler then operates with oxy-fuel combustion. It is possible to recycle a portion of the flue gases (essentially $CO_2$) with the oxygen in order to avoid reaching too high temperatures in the boiler. The $CO_2$ capture is therefore achieved at lower cost.

This technique is promising from the point of view of both investment and global energy efficiency.

Electricity producers have various production means that are more or less costly to operate, for example wind turbines, nuclear power stations, etc., and obviously carbonaceous fuel power stations (CFPS). CFPSs are relatively costly to operate. According to the present invention, the operation of the electricity production method varies depending on the selling price of electricity generated by the CFPS.

Equally depending on this sale price, the electricity producer may decide to capture all or some of the $CO_2$ emitted by the CFPS, and optionally not to capture it.

The partial capture of $CO_2$ is not very well suited to the oxy-fuel combustion technology. Effectively, it is necessary to operate at 100% oxy-fuel combustion or air combustion, but it is difficult to avoid these regimes. Specifically, if there is more than 30% nitrogen in the flue gases, the separation of the $CO_2$ loses all the advantages that are obtained when the flow is more concentrated.

Therefore, the benchmark solution for a partial capture would be to invest the air separation unit (ASU) 100% and to operate it at 100% of its capacity. It is possible however to invest only a portion of the compression and drying unit (or to invest it at 100% but to operate it only to the extent of the $CO_2$ that it is desired to capture). Unfortunately, this compression and drying unit represents only a small portion of the investment and of the self-consuming energy, unlike the ASU.

Furthermore, operating with an ASU at 100% of its capacity means consuming a constant quantity of energy over time which does not allow adaptation to the variations in cost and in output of available energy.

Because of this, one problem that arises is that of proposing an electricity production method that makes it possible to produce electricity more profitably than the method already known.

If, at a given moment, the price of electricity is very high, this means that the marginal cost of production becomes very high. If this cost becomes very high, the electricity supply network may be required to make use of production means of last resort. These (for example a diesel/fuel generator unit, a gas open cycle) are of much reduced efficiency and have $CO_2$ emissions factors that are often very high. These emissions factors are often even higher than those of the oxy-fuel combustion station operating in degraded mode being supplied with air and with no $CO_2$ sequestration.

Therefore, according to the invention, it is advised to produce electricity by using an oxy-fuel combustion station, even discharging the $CO_2$ to the atmosphere, without treating it, because on the global scale, the $CO_2$ emissions will be less than those of the production means of last resort. Therefore emitting more $CO_2$ at the oxy-fuel combustion station when electricity is very expensive makes it possible on the network scale to reduce $CO_2$ emissions relative to those of the prior art.

According to one subject of the invention, provision is made for a method for generating electricity by burning of carbonaceous fuels using an air gas production unit, a unit for burning carbonaceous fuels with a first operating mode with air in which it is supplied with air and no oxygen-enriched fluid originating from the production unit and a second operating mode with oxygen in which it is supplied only with an oxidant that is leaner in nitrogen and richer in oxygen than the air, this oxidant originating at least partially from the air gas and a unit for the compression and/or purification of the $CO_2$ (16, 20) originating from the combustion flue gases, in which, during the operation of the air gas production unit, air is sent to the air gas production unit, during the operation of the combustion unit and of the compression and/or purification unit, at least one portion of the combustion flue gases sent to the compression and/or purification unit originate from the combustion unit, characterized in that, if the sale price of the electricity generated exceeds a first threshold and/or if the purchase price of the electricity consumed by at least one of the units exceeds a second threshold and/or if the price of venting the combustion flue gases is below a third threshold and/or if the ratio between the price for venting the flue gases and the sale price of the electricity is below a fourth threshold, the quantity of flue gases sent to the compression and/or purification unit is reduced, possibly to zero, and the quantity of flue gases sent to the air is increased, optionally while sending all the flue gases to the air.

The price of venting the flue gases corresponds to a carbon tax that is required when a gas containing carbon dioxide is discharged to the atmosphere.

When it is said that during air operation, no oxygen-enriched fluid from the production unit is sent to the boiler, this does not exclude the possibility that a small flow rate that is oxygen-enriched, representing at most 5% of the air flow rate can be sent to the boiler.

The concept of air operation also does not exclude the possibility that the combustion unit can receive other oxidants from sources other than the air gas production unit, for example a portion of the flue gases. Similarly, the concept of oxygen operation does not exclude the possibility that the combustion unit can receive other oxidants from sources other than the air gas production unit.

According to other optional features:

- if the sale price of the electricity generated exceeds the first threshold and/or if the purchase price of the electricity consumed by at least one of the units exceeds the second threshold, the quantity of air sent to the air gas separation unit and/or the quantity of oxidant sent from the air gas separation unit to the combustion unit is reduced and the quantity of air sent to the combustion unit is increased.
- if the sale price of the electricity exceeds the first threshold, the quantity of air sent to the air gas separation unit and/or the quantity of oxidant sent from the separation unit is reduced, possibly to zero, and the combustion unit is supplied with air, no longer receiving oxidant that is leaner in nitrogen and richer in oxygen than the air.
- the quantity of air sent to the combustion unit is increased, possibly from zero, if the sale price of the electricity is greater than a fourth threshold, which may be less than, equal to or greater than the first threshold, as appropriate.
- the combustion unit operates only with air if the sale price of electricity exceeds the first threshold and possibly only with oxidant leaner in nitrogen than the air if the sale price of electricity is below the first threshold.
- if the price of electricity is below a threshold, the quantity of oxygen in the air sent to the air gas separation unit is greater than the quantity of oxygen in the oxidant sent from the air gas separation unit to the combustion unit.
- if the price of electricity is above a threshold, the quantity of oxygen in the air sent to the air gas separation unit is less than the quantity of oxygen in the oxidant sent from the air gas separation unit to the combustion unit.
- a portion of the quantity of oxygen in the oxidant is supplied by vaporization of oxidant stored in liquid form.
- if the sale price of the electricity is below a threshold, the quantity of air sent to the air gas separation unit and/or the quantity of oxidant sent from the separation unit and/or the quantity of flue gases sent to the compression and/or purification unit is reduced, possibly to zero.
- if the sale price of the electricity is below a threshold, the combustion unit does not operate.
- the combustion unit in operation is always supplied with a fuel that is a carbonaceous fuel.
- the combustion unit in operation is always supplied with substantially the same carbonaceous fuel, irrespective of the price of the electricity.
- the combustion unit in operation is always supplied with coal.

According to another subject of the invention, provision is made for a method for operating an electricity generation network linked to a first unit operating according to the method described above and at least a second electricity generation unit releasing to the atmosphere in nominal operation a first given quantity of carbon dioxide per hour in which, if the sale price of the electricity generated exceeds the first threshold, the first unit will be operational releasing to the atmosphere less carbon dioxide per hour than the first quantity while the second unit is not operational.

A "air gas production unit" means a unit comprising the unit for separating the gases from the air, the various cryogenic storage elements and the pipes necessary for its operation. This unit can operate by cryogenic distillation.

A "combustion unit" means for example a boiler or an incinerator, preferably a circulating fluidized bed boiler or a pulverized coal boiler.

A "circulating fluidized bed boiler" means a boiler in which the fuel is burnt in suspension in air or oxygen.

A "pulverized coal boiler" means a boiler in which the fuel is finely crushed.

"Carbonaceous fuels" include for example coal, lignite, household waste, any biomass-derived fuel (plant waste, plant production dedicated to combustion, etc.).

"Oxidant that is leaner in nitrogen than air" means a fluid that is richer in oxygen relative to air, in particular 60 mol % of oxygen, preferably at least 90 mol % of oxygen. Another oxidant, for example a portion of the flue gases can be sent to the CFPS.

The energy necessary for the operation of the various units used in the combustion method comes either from the electricity production unit itself supplied at least partly by the oxygen produced, or from another electricity production unit via an electricity transport network, or by direct provision of electricity from a renewable source (solar panels, wind turbines, a hydroelectric dam, etc.).

BRIEF DESCRIPTION OF THE FIGURE

FIG. 1 represents a general diagram of an assembly capable of operating according to the method of the invention for the capture of $CO_2$ from a air gas separation unit, from a combustion unit using a pulverized coal boiler and operating alternately with an oxidant that is leaner in nitrogen than air and with air, and a $CO_2$ compression and purification unit.

DETAILED DESCRIPTION OF THE INVENTION

An air delivery duct 1 is connected to the air gas separation unit 2 which is connected to an oxygen production duct 3. The oxygen duct 3 is connected to a storage element 21 and indirectly to a combustion unit 7. The oxygen duct is first connected to a mixer 4 allowing the mixing of oxygen with a $CO_2$ recirculation through a duct 6, 18. An oxidant-delivery duct 5 is connected to the mixer 4 and to the pulverized coal boiler 7.

A fuel, in this instance raw coal, inlet line 8 is connected to a pulverizer 10 which is connected to the pulverized coal boiler 7.

A steam duct from the boiler 7 is connected to a steam turbine 11 which can supply a mechanical force. This force can be converted into energy with the aid of an alternator 12 in order to supply electricity.

A combustion-flue-gas duct 13 is connected to a dedusting unit 14, and optionally to a desulfurization unit 15. The flue gases can be sent to the $CO_2$ compression and/or purification unit (CPU) 20 or discharged to the atmosphere through the duct 23. The unit 16 can be a conditioning unit such as a compression unit and the unit 9 can be a pretreatment unit.

There are five operating modes for the assembly depending on the electricity sale price and/or purchase price.

1) Very High Electricity Price and Low Price for Venting the Boiler Flue Gases to the Air.

If the price of the electricity generated by the assembly exceeds a first threshold and at the same time the price for venting the boiler flue gases is below a second threshold, the boiler is no longer supplied with oxygen but only with air. In this case, the air separation apparatus 2 is no longer supplied with air and produces neither oxygen nor nitrogen. Similarly, the CPU unit 20 does not operate and the flue gases are vented through the duct 23. This operating mode may also be set in motion when the ratio between the price for venting the flue gases and the price of the electricity generated is below a third threshold. The compression unit 16 does not operate.

In this instance, it is of greater value to sell the electricity that would have been consumed by the air separation apparatus and by the CPU unit rather than to use it to operate these devices.

It is also possible to shut down just the air separation apparatus by stopping sending air to it and continuing to operate the CPU unit 20 by supplying the boiler only with stored oxidant.

2) High Electricity Price

The air separation apparatus 2 separates less air than it produces as an air gas, a portion of the products originating from the vaporization of separated products while electricity is cheaper.

The CPU unit 20 is also operating like the compression unit 16 and the boiler is supplied with oxygen.

In this case, the quantity of oxygen in the air sent to the air separation apparatus 2 may be less than the quantity of oxygen in the flow rate 5 sent to the boiler 7.

3) Moderate Electricity Price

The CPU unit 20 is also operating and the boiler is supplied with oxygen.

The boiler operates at a rate that is lower than the rate when the electricity price is high (the previous case). The air separation apparatus separates less air than it produces as air gas, a portion of the products originating from the vaporization of products separated while electricity is cheaper.

4) Low electricity price

In this case, the production of electricity is moderate. The boiler 7 is supplied with oxygen. The boiler 7 operates at a very low rate, that is to say at approximately 50% for example, this rate being further reduced than in the previous case of moderate electricity price. Since the boiler does not operate at its maximum production, the flue gases produced will be reduced and therefore the CPU unit 20 operates with reduced $CO_2$ production. The air separation apparatus 2 separates more air than it produces as an air gas, a portion of the separated air being stored in liquid form.

In this case, the quantity of oxygen in the air flow rate 1 sent to the air separation apparatus 2 may be greater than the quantity of oxygen in the flow rate 5 sent to the boiler 7.

5) Very Low Electricity Price

The air separation apparatus operates but produces only the liquid products that are sent to the storage elements or to the storage element if there is only one product. If the liquid storage element or elements are full, the air separation apparatus 2 does not operate. The CPU unit 20 does not operate and neither do the compression unit 16 or the boiler 7.

Irrespective of the electricity price, if the boiler is operating, it is supplied with coal.

In order to operate an electricity generation network, it is necessary to make choices regarding the electricity-generation means that are used. A network can be connected to a first unit operating according to the method described above in which, if the sale price of electricity is very high, the air separation apparatus does not operate, the boiler is supplied exclusively with air and the flue gases produced are discharged to the atmosphere, releasing a quantity of carbon dioxide per hour. This may be preferable to operating a second electricity generation unit releasing to the atmosphere in nominal operation a given quantity of carbon dioxide per hour that is greater than that released by the boiler.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for generating electricity by burning of carbonaceous fuels using an air separation unit, a compression purification unit, and a unit for burning carbonaceous fuels, said method comprising;
   a compression purification unit for separating a carbon dioxide stream from a combustion flue gas originating in the carbonaceous fuel burning unit,
   a first operating mode with air in which said carbonaceous fuel burning unit is supplied with air and no oxygen-enriched fluid originating from the air separation unit, and
   a second operating mode with oxygen in which said carbonaceous fuel burning unit is supplied only with an oxidant that is leaner in nitrogen and richer in oxygen than the air,
      said oxidant originating at least partially from the air separation unit and said compression purification, in which, during the operation of the air separation unit, air is sent to the air separation unit, wherein,
   if a sale price of the electricity generated exceeds a first threshold, or
   if a purchase price of electricity consumed by at least one of the units exceeds a second threshold, or
   if a price of venting the combustion flue gas is below a third threshold, or
   if a ratio between the price for venting the flue gases and the sale price of the electricity is below a fourth threshold,
   the quantity of flue gas sent to the compression purification unit is reduced and the quantity of flue gases which is vented is increased.

2. The method of claim 1, wherein the quantity of flue gas sent to the compression purification unit is reduced to zero.

3. The method of claim 1, wherein all of the flue gas is vented.

4. The method of claim 1, wherein if the sale price of the electricity generated exceeds the first threshold, or if the purchase price of the electricity consumed by at least one of the units exceeds the second threshold, the quantity of air sent to the air separation unit, or the quantity of oxidant sent from the air separation unit to the carbonaceous fuel burning unit is reduced and the quantity of air sent to the carbonaceous fuel burning unit is increased.

5. The method of claim 1, wherein, if the sale price of the electricity exceeds the first threshold, the quantity of air sent to the air separation unit, or the quantity of oxidant sent from the air separation unit is reduced, and the carbonaceous fuel burning unit is supplied with air, no longer receiving oxidant that is leaner in nitrogen and richer in oxygen than the air.

6. The method of claim 1, wherein the quantity of air sent to the carbonaceous fuel burning unit is increased, if the sale price of the electricity is greater than the fourth threshold, which may be less than, equal to or greater than the first threshold.

7. The method of claim 1, wherein the carbonaceous fuel burning unit operates only with air if the sale price of electricity exceeds the first threshold and only in oxidant leaner in nitrogen than the air if the sale price of electricity is below the first threshold.

8. The method of claim 1, wherein, if the price of electricity is below a threshold, the quantity of oxygen in the air sent to the air separation unit is greater than the quantity of oxygen in the oxidant sent from the air separation to the carbonaceous fuel burning unit.

9. The method of claim 1, wherein, if the price of electricity is above a threshold, the quantity of oxygen in the air sent to the air separation unit is less than the quantity of oxygen in the oxidant sent from the air separation unit to the carbonaceous fuel burning unit.

10. The method of claim 1, wherein a portion of the quantity of oxygen in the oxidant is supplied by vaporization of oxidant stored in liquid form.

11. The method of claim 1, wherein, if the sale price of the electricity is below a threshold, the quantity of air sent to the air separation unit, or the quantity of oxidant sent from the air separation unit, or the quantity of flue gases sent to the compression, or purification unit is reduced.

12. The method of claim 1, wherein, if the sale price of the electricity is below a threshold, the carbonaceous fuel burning unit does not operate.

13. The method of claim 1, wherein the carbonaceous fuel burning unit in operation is always supplied with a fuel that is a carbonaceous fuel.

14. The method of claim 1, wherein the carbonaceous fuel burning unit in operation is always supplied with coal.

* * * * *